US007005824B2

(12) United States Patent
Akiwa

(10) Patent No.: US 7,005,824 B2
(45) Date of Patent: Feb. 28, 2006

(54) SHUTTER MECHANISM INCLUDING STEPPING MOTOR CONTROL APPARATUS WITH UPPER AND LOWER LIMIT STOPPING POSITION CONTROL

(75) Inventor: Naotaka Akiwa, Miyota-Machi (JP)

(73) Assignee: Minebea Co., Ltd., Nagano-ken (JP)

(*) Notice: Subject to any disclaimer, the term of this patent is extended or adjusted under 35 U.S.C. 154(b) by 1 day.

(21) Appl. No.: 10/738,205

(22) Filed: Dec. 18, 2003

(65) Prior Publication Data

US 2004/0169487 A1 Sep. 2, 2004

(30) Foreign Application Priority Data

Dec. 25, 2002 (JP) ............................ 2002-373953

(51) Int. Cl.
*G05B 19/40* (2006.01)

(52) U.S. Cl. ...................... 318/684; 318/685; 318/671; 318/808; 318/811; 318/265; 318/266

(58) Field of Classification Search ................ 318/684, 318/685, 671, 808, 811, 265, 266
See application file for complete search history.

(56) References Cited

U.S. PATENT DOCUMENTS

| | | | | |
|---|---|---|---|---|
| 4,902,953 | A * | 2/1990 | Kraft et al. | 318/663 |
| 5,038,087 | A * | 8/1991 | Archer et al. | 318/469 |
| 5,467,808 | A * | 11/1995 | Bell | 160/168.1 P |
| 5,751,128 | A * | 5/1998 | Chalupa et al. | 318/439 |
| 5,850,131 | A * | 12/1998 | Wolfer et al. | 318/466 |
| 6,060,852 | A * | 5/2000 | Domel et al. | 318/480 |

FOREIGN PATENT DOCUMENTS

| | | | |
|---|---|---|---|
| GB | 2313499 A | * | 11/1997 |
| JP | A-2000-60185 | | 2/2000 |
| WO | WO 02/06622 A1 | | 1/2002 |

* cited by examiner

*Primary Examiner*—Rita Leykin
(74) *Attorney, Agent, or Firm*—Adduci, Mastriani & Schaumberg, L.L.P.

(57) ABSTRACT

A shutter mechanism includes a drum (2), a stepping motor (5), a driver (20), a microcomputer (10), a memory (16), and a load magnitude detection circuit (30) that detects the magnitude of the load on the stepping motor (5) when an object such as a shutter (3) is either wound or unwound from the drum (2). The microcomputer (10) can set the upper and lower limit stopping positions of the shutter (3) by resetting the number of command pulses stored in the memory (16) when the load magnitude detection circuit (30) detects an increase in the load at the stepping motor (5), and storing the number of command pulses output to that point from the memory (16) when the load magnitude detection circuit (30) next detects an increase in the load at the stepping motor (5) after the outputting of the command pulses is next restarted.

21 Claims, 4 Drawing Sheets

SHUTTER MECHANISM INCLUDING STEPPING MOTOR CONTROL APPARATUS WITH UPPER AND LOWER LIMIT STOPPING POSITION CONTROL

CROSS REFERENCE TO RELATED APPLICATION

The present application is related to, and claims priority from, Japanese patent application no. 2002-373953, filed on Dec. 25, 2002, the contents of which are incorporated herein by reference.

BACKGROUND

The present invention relates to shutter mechanisms for shutters, elevators, or the like, and in particular to improvement of the stopping control at the upper and lower limit positions of an object to be wound and unwound by using the detected magnitude of a load generated at a motor used to wind and unwind the object.

Shutter mechanisms such as the one disclosed in Japanese unexamined patent application 2002-332788 are equipped with a shutter main unit having multiple hinged plates, a drum around which the hinged plates are wound, a motor that rotates the drum, and a speed reduction mechanism. This type of shutter mechanism is typically installed at the top of entrances and exits of shops, factories, or the like, and the motor rotates the drum to open and close the entrance/exit by respectively winding and unwinding the hinged plates. In general terms, the shutter mechanism described herein, and particularly the stepping motor control apparatus, may be used for controlling any stepping motor used in an application requiring accurate bi-directional control of first and second stopping positions of an object that is moved thereby.

More specifically, the motor of the shutter mechanism is typically activated by the push of a button located on, for example, a wall inside the entrance/exit. When the button is pushed, a controller controls the current provided to the motor to thereby cause the motor to rotate the drum in a forward direction to unwind the shutter, to rotate the drum in the reverse direction to wind the shutter, or to stop. Furthermore, sensors detect the upper limit position for winding the shutter main unit and the lower limit position for unwinding the shutter main unit. The detection results are input into the controller, and the controller then stops the motor based on the detection results.

In a shutter mechanism such as the one described above, the motor rotor continues to rotate briefly due to inertia even after the controller stops the current to the motor. As a result, there is a time lag until the motor stops completely, reducing the precision of the position wherein the shutter main unit comes to rest. In addition, a shutter mechanism that includes the sensors for sensing the upper limit position for winding the shutter main unit and the lower limit position for unwinding the shutter main unit requires additional parts, and the assembly required to place the sensors in the location wherein the shutter mechanism will be used is complicated and time-consuming.

A brake mechanism can be provided on the drum, and a speed reduction mechanism may be connected to the drum through a clutch, in order to increase-the accuracy of the position where the shutter main unit comes to rest. However, such a brake mechanism would require an even higher number of parts, and would further increase the cost of manufacturing and assembly of the shutter mechanism.

SUMMARY OF THE INVENTION

In view of the above, it is an object of the present invention to provide a shutter mechanism that is capable of improving the accuracy of the position at which an object to be selectively wound and unwound (hereinafter object) stops, without increasing the number of parts or adding cost to the manufacture of the mechanism.

It is a further object of the present invention to provide a shutter mechanism wherein the upper and lower limit positions of the object to be wound and unwound can be easily set.

It is yet another object of the present invention to provide a stepping motor control apparatus with upper and lower limit stopping position control for a shutter mechanism including an object to be wound and unwound.

The shutter mechanism of the present invention is equipped with a drum including an object to be selectively wound and unwound, a stepping motor for rotating the drum, a driver for supplying a drive current to the stepping motor, a controller for supplying command pulses to the driver, a memory for storing control data for the controller, and a load magnitude detection circuit that detects the magnitude of a load on the stepping motor.

Because the shutter mechanism of the present invention includes a stepping motor as the motive source for the drum, it possible to control the speed and to immediately stop the stepping motor as soon as the controller issues the stop command. Consequently, it is possible to increase the stopping precision of the shutter mechanism without increasing the number of parts. In addition, because the load magnitude detection circuit detects the magnitude of the load on the stepping motor, the detection results thereof can be used to set the upper and lower limit positions for the object, and can be used to provide, for example, an emergency stop feature.

The structure of the shutter mechanism of the present invention is such that the load generated at the stepping motor increases when the object arrives at the upper limit position when wound, or at the lower level position when unwound, making it possible for the load magnitude detection circuit to detect that the object has arrived at the upper level position or at the lower level position by detecting the increase in the load.

Furthermore, the memory stores the number of command pulses to be output from the controller in order to move the object between the upper limit position and the lower limit position. This makes it possible for the controller to read out the number of command pulses stored by the memory, and to control the number of command pulses output to the driver. For example, even if the object is halted temporarily between the upper limit position and the lower limit position, it is still possible to stop the object at the upper limit position or at the lower limit position after restarting movement of the object.

The controller can set the number of command pulses stored in the memory and stop the output of the command pulses to the driver when the load magnitude detection circuit detects an increase in the magnitude of the load at the stepping motor. The controller can then subsequently restart the output of the command pulses to the driver, and cause the memory to store the number of output command pulses output up to the point that the load magnitude detection circuit detects an increase in the magnitude of the load at the stepping motor, after the output of the command pulses has been restarted. With this type of situation, the object is, for example, first wound to the upper limit position and then unwound to the lower limit position, and the number of pulses output by the controller in order to move the object from the upper limit position to the lower limit position is stored in the memory. As a result, it is possible to detect the arrival of the object at the upper or lower limit position by counting the number of corresponding command pulses output by the controller.

The memory may be a nonvolatile memory that stores the number of command pulses, making it possible for the controller to compare the number of command pulses output to the driver with the number of command pulses read out from the non-volatile memory. Consequently, it is possible to accurately stop the object at the upper limit position or the lower limit position. The non-volatile memory may be a non-volatile RAM, EPROM, one or more floppy disks, one or more hard disks, one or more magneto-optical disks, or other memory media capable of retaining stored data when the power is turned off. Using the configuration described above, it is possible to automatically set the upper limit position and the lower limit position of the object.

The controller may also be capable of stopping or reversing the motion of the object when the object moves between the upper limit position and the lower limit position and the magnitude of the load detected by the load magnitude detection circuit exceeds a preset value. For example, if there is an obstruction in the movement path of the object as the object is being unwound, the magnitude of the load will increase when the object strikes the obstruction. The controller then can either stop or reverse the direction of the object, thus preventing damage to the obstruction, the object and components of the shutter mechanism.

The driver used in the shutter mechanism of the present invention may be a chopper-type current source driver that outputs a chopper signal that chops out the square wave that is output by the driver. The chopper-type current source driver maintains the current to the stepping motor at a steady value using the chopper signal. In other words, the chopper signal will prevent an increase in the current that would otherwise occur when the magnitude of the load on the stepping motor increases. This type of chopper signal causes the square waves generated by the chopper-type current source driver to be chopped into a comb-tooth pattern. Consequently, the frequency of the output of the chopper signal increases in proportion to the magnitude of the load.

The load magnitude detection circuit is equipped with a waveform detector that detects and outputs the chopper signal, where the magnitude of the load is detected based on the waveform output from the waveform detector. The load magnitude detection circuit can be equipped with a filter that converts the waveform output from the waveform detector into a series of continuous pulses, making it possible for the magnitude of the load to be detected based on the width of the pulses output from the filter. Conversely, the load magnitude detection circuit can be equipped with a filter that converts the waveform signal output from the waveform detector into a voltage signal, making it possible to detect the magnitude of the load based on the voltage signal output from the filter.

The filter can be equipped with a capacitor having a capacitance that can be set in accordance with the desired shape of the pulses. For example, if the capacitance of the capacitor is relatively small, then the comb-tooth pattern of the chopper waveform can be made into a continuous series of pulses. Consequently, the controller is able to detect the magnitude of the load on the stepper motor based on the width of the pulses output from the filter.

Furthermore, if the capacitance is large, then the pulses, as described above, will be contiguous with one another, making it possible to produce a smooth waveform. Given this, if the filter is equipped with, for example, a comparator, the comparator can generate and output a signal to the controller if the voltage of the flat waveform exceeds a predetermined voltage that is set in the comparator or stored in the memory.

The waveform detector can be equipped between the coil and the power supply of the stepping motor, making it possible to detect the chopper signal. When the chopper signal and the square waves chopped into a comb-toothed pattern are output, the voltage of the drive current momentarily falls with the timing with which the chopper signal is output. The chopper signal can be detected as the collector current in an amplifier when the drop in the voltage is input as the base voltage of the amplifier. The waveform of this collective current is a comb-tooth pattern chopper waveform.

BRIEF DESCRIPTION OF THE DRAWINGS

The accompanying figures, where like reference numerals refer to identical or functionally similar elements throughout the separate views and which together with the detailed description below, are incorporated in and form part of the specification, serve to further illustrate various embodiments and to explain various principles and advantages all in accordance with the present invention.

DETAILED DESCRIPTION

Figure 1:
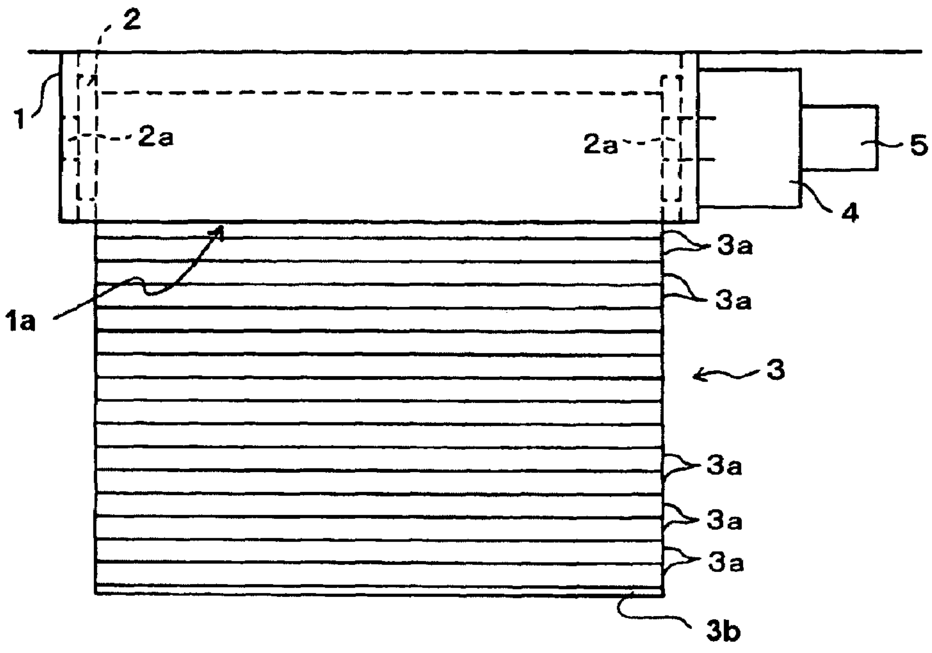
FIG. 1 is a front elevation view of a shutter mechanism according to the present invention.

Referring now to the drawings in which like numbers reference like parts, a shutter mechanism according to a preferred exemplary embodiment of the present invention will be discussed. FIG. 1 shows a shutter mechanism equipped at the top part of an entrance/exit for a factory or the like. A housing 1 houses a drum 2 in such a way that the drum 2 can rotate. A shutter 3, or, more generally, an object to be selectively wound onto and unwound from the drum 2 (an object), includes multiple hinged plates 3*a* and is attached at one end thereof to the drum 2 such that the shutter 3 is capable of being wound onto, and unwound from, the drum 2. An end of the shutter 3 opposite the end that is attached to the drum 2 hangs in a downward direction from an opening 1*a* in the housing 1. The drum 2 includes axles 2*a* at both ends thereof that are supported at respective ends of the housing 1 in such a way that they can rotate freely. The axle 2*a* on the right side of the drum 2 in FIG. 1 is connected to an output axle of a stepping motor 5 through a speed reducer 4 equipped at a right side of the housing 1.

Figure 2:
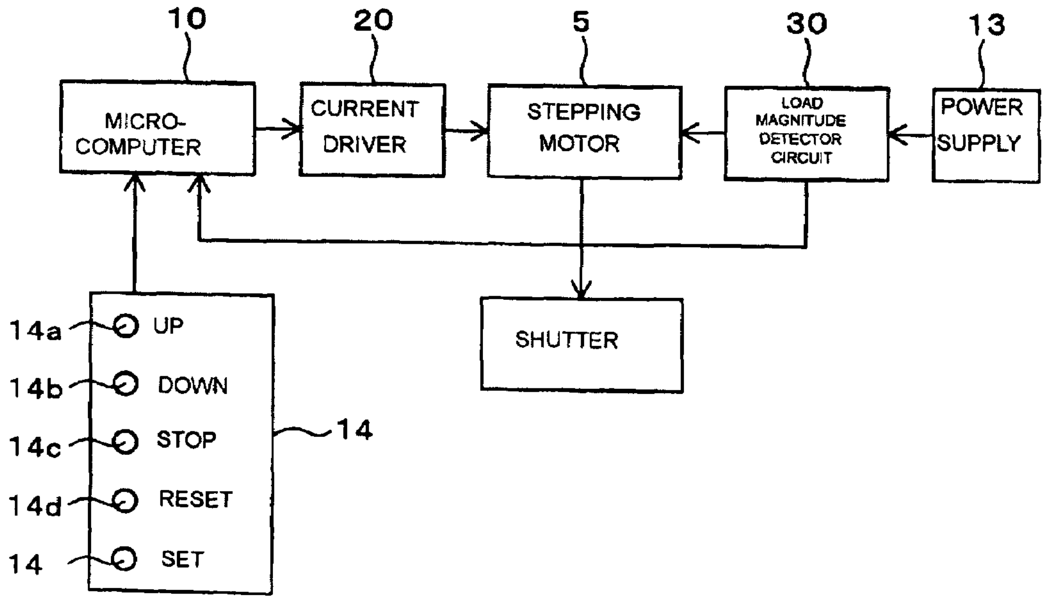
FIG. 2 is a block schematic diagram of the stepping motor control apparatus included in the shutter mechanism of FIG. 1.
Figure 3:
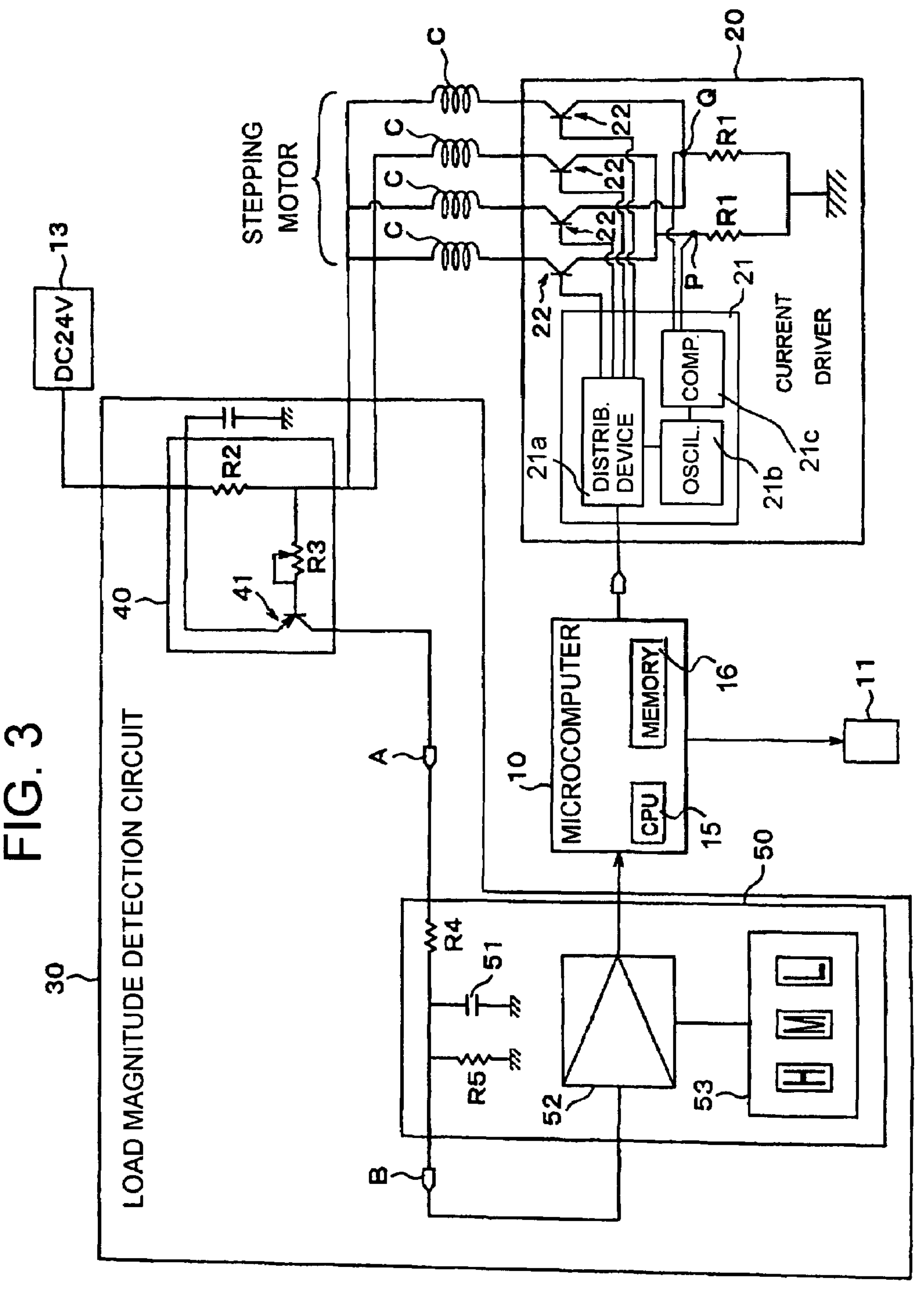
FIG. 3 is a circuit diagram of certain components of the stepping motor control apparatus of FIG. 2.

Referring now to FIGS. 2 and 3, a stepping motor control apparatus of the shutter mechanism is shown. The stepping motor control apparatus includes a microcomputer 10 with a CPU 15, a memory 16, and other well known components such as, for example, an A/D converter, a D/A converter and an I/O interface, all of which are not shown for ease of illustration purposes. The microcomputer 10 outputs command pulses to a chopper-type current source driver (hereinafter current driver) 20, and the current driver 20 provides a specific DC current from the power supply 13 to the coils C of the stepping motor 5 with a timing based on command pulses, the details of which will be discussed below in more detail.

As is shown in FIG. 3, the current driver 20 is equipped with a control part 21, and an amplifier 22 formed from, for example, field effect transistors (FETS). The control part 21 includes components such as a distributor device 21*a,* an oscillator 21*b* and a comparator 21*c.* The distributor device 21*a* may be, for example, a bistable, flip flop, integrated circuit or the like that distributes a square waveform, also referred to as a pulsed or chopper signal, to control the application of bias current to the elements of the amplifier 22 based on control signals, or pulsed signals, from the microcomputer 10. The bias current causes an emitter current to flow from the power supply 13 to the amplifier 22, forming the drive current supplied to the coils C. The comparator 21*c* monitors the voltage at terminals P and Q of the resistor R1 equipped between ground and the collectors of the FETS of the amplifier 22, and outputs a logical signal to the oscillator 21*b* upon detecting that the voltage across terminals P and Q has increased by a predetermined amount. This predetermined amount of increase indicates that the value of the drive current has increased, which in turns indicates that the magnitude of the load on the stepping motor 5 has increased. Upon receiving the logical signal from the comparator 21*c,* the oscillator 21*b* outputs a square wave, or pulsed, signal to the distributor 21*a* at a frequency of between approximately 10 KHz and 40 KHz to chop the control signals from the microcomputer 10. By outputting a resulting chopper signal, the control part 21 can maintain the drive current of the motor 5 at a constant level.

Still referring to FIG. 3, the load magnitude detection circuit 30 is connected between the power supply 13 and the coils C of the stepping motor 5 and includes both a waveform detector 40 and a waveform generator circuit 50. A load resistor R2 within the waveform detector 40 is connected in series between the power supply 13 and the coils C, and an amplifier 41 is equipped in parallel between the two terminals of the load resistor R2 through a variable resistor R3. When the current driver 20 outputs the chopper signal so that the supplied drive current falls at that instant and the base voltage on the amplifier 41 drops as a result, the amplifier 41 outputs a collector current to the waveform generator circuit 50.

Figures 4A, 4B, 4C:
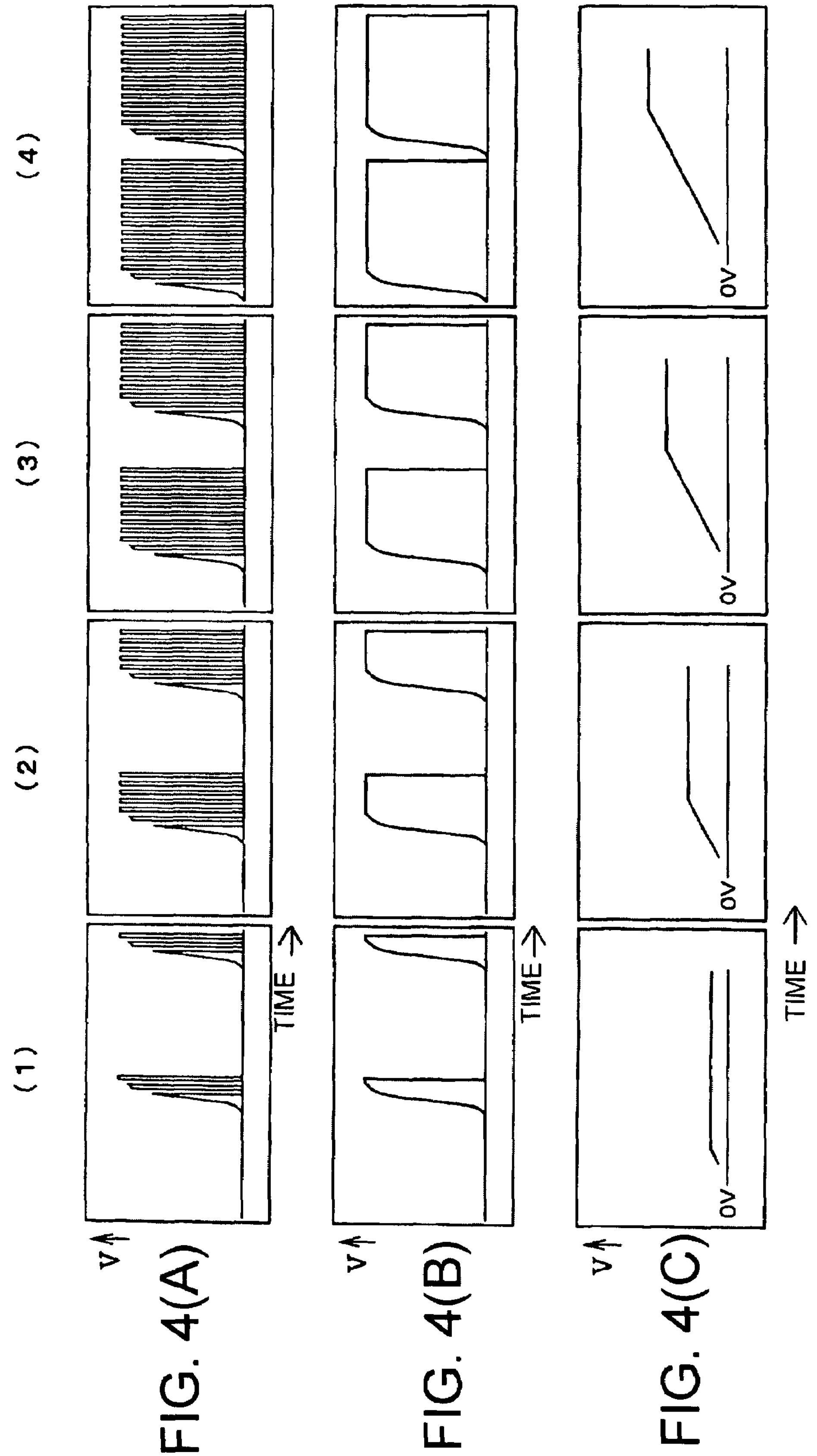
FIG. 4A shows an exemplary comb-tooth pattern collector current waveform at point A in FIG. 3.
FIGS. 4B and 4C respectively show exemplary pulse waveforms and voltage levels at point B in FIG. 3.

The waveform generator circuit 50 includes a capacitor 51 and a comparator 52, along with resistors R4 and R5. The capacitor 51 and resistors R4, R5 effectively form a filter that causes the comb-tooth pattern collector current waveform (chopper waveform) output from the waveform detector as shown in FIG. 4A to form a pulsed signal from a continuous series of pulses as shown in FIG. 4B. This pulsed signal is input into the microcomputer 10, where the microcomputer 10 infers the magnitude of the load on the stepping motor 5 based on the width, or in other words, the time duration, of the pulse signal.

If the capacitance of the capacitor 51 is large, then the pulses will be contiguous with each other, forming flat waveforms of different voltages, as shown in FIG. 4C. When the pulses form flat waveforms, the flat waveforms are input into the comparator 52. If the voltage thereof is greater than a predetermined voltage set for the comparator 52, the comparator 52 outputs a signal to the microcomputer 10. The microcomputer 10 infers whether or not the magnitude of the load on the stepping motor 5 is in excess of a specific predetermined value based on the presence or absence of a signal output by the comparator 52. Note that the comparator 52 is not enabled when the pulsed signal is as shown in FIG. 4B.

FIG. 3 also shows selector switches 53 for setting the predetermined voltage for the comparator 52, where the selector switches correspond to three different voltage levels: HIGH (H); MID (M); and LOW (L). Also, an LED 11 may be included to be illuminated when the microcomputer 10 determines that the magnitude of the load on the stepping motor 5 is in excess of a specific predetermined value.

Referring again to FIG. 2, an exemplary switchboard 14 is shown as being connected to the microcomputer 10. The switchboard 14 is equipped with UP, DOWN and STOP switches 14*a,* 14*b,* and 14*c* for raising, lowering, and stopping the shutter 3. The switchboard 14 is also equipped with RESET and SET switches 14*d* and 14*e* for setting upper and lower limit positions of the shutter 3.

Manual setting of the upper and lower limit positions of the shutter 3 by the shutter mechanism described above will now be explained. First, when the DOWN switch 14*b* is operated, a signal indicative thereof is output to the microcomputer 10. This causes command pulses to be output from the microcomputer 10 to the current driver 20, and the control part 21 thereof outputs a square wave with the same width (time) as the command pulses to the amplifier 22. This square wave in turn causes emitter current to flow from the power supply 13 to the amplifier 22 to thereby supply the drive current to the coils C. Consequently, the output axle of the stepping motor 5 rotates to rotate the drum 2 and thus unwind the shutter 3. At this time, and each time a command pulse is output, the microcomputer 10 decrements the value in a register in the CPU 15.

The STOP switch 14*c* is operated when the bottom edge part of the shutter 3 has been lowered far enough to contact, for example, the floor. This stops the output of the command pulses from the microcomputer 10, and as a result the stepping motor 5 stops immediately. The RESET switch 14*d* is then operated to cause the memory 16 to be cleared and, at the same time, to clear the number of command pulses stored in the register of the CPU 15, thereby effectively storing the lower limit position of the shutter 3.

When the UP switch 14*a* is actuated the shutter 3 is wound onto the drum 2. During this winding operation, the value in the register of the CPU 15 is incremented each time a command pulse is output. When the lower edge of the shutter 1 arrives, for example, in the vicinity of the opening 1*a* of the housing 1, the STOP switch 14*c* is actuated to stop the winding of the shutter 3. Next, when the SET switch 14*e* is operated, the number of command pulses stored in the register is then stored in the memory 16, thereby effectively storing the upper limit position of the shutter 3 in the memory 15.

Automatic setting of the upper and lower limit positions of the shutter 3 by the shutter mechanism described above will now be explained. Initially, the DOWN switch 14*b* is automatically actuated to unwind the shutter 3 until the lower edge of the shutter 3 contacts the floor surface. This will cause the magnitude of the load on the stepper motor 5 to increase.

Figure 5A:
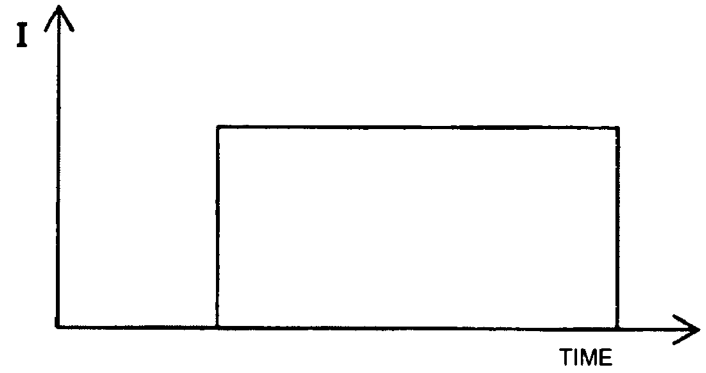
FIG. 5A is a graph of current versus time for the waveform of the drive current supplied from the power supply shown in FIG. 3.
Figure 5B:
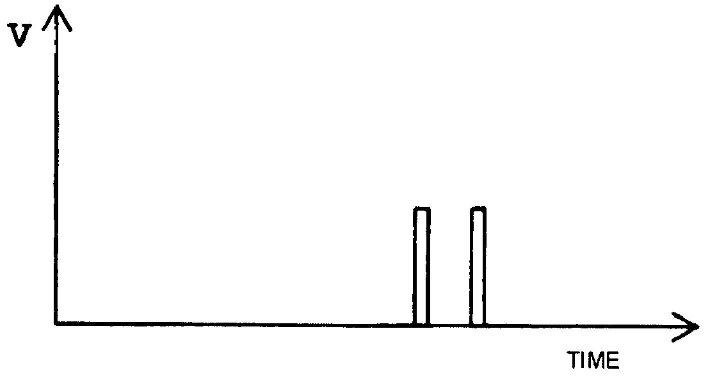
FIG. 5B is a graph of voltage versus time for the waveform of a chopper signal output from the current driver shown in FIG. 3.
Figure 5C:
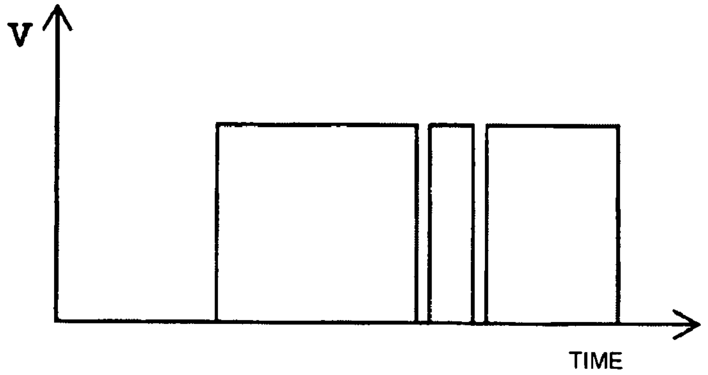
FIG. 5C is a graph of voltage versus time for the waveform of the square wave that is output from an amplifier of the current driver shown in FIG. 3 in response to the chopper signal shown in FIG. 5B being output from a control part of the current driver.

FIG. 5A shows the waveform of the drive current supplied from the power supply 13. When the magnitude of the load on the stepping motor 5 increases, the drive current supplied from the power supply 13 also increases. This causes the voltage across the terminals of the resistor R1 (at points P and Q) to increase. The control part 21 detects the increase and consequently outputs a chopper signal such as the chopper signal shown in FIG. 5B. FIG. 5C shows the waveform of the square wave that is output from the current driver 20 when the chopper signal is output. As is shown in FIG. 5C, the square waves assume a shape that is chopped into a comb-tooth pattern and that has a timing corresponding to that with which the chopper signal is output.

Figure 5D:
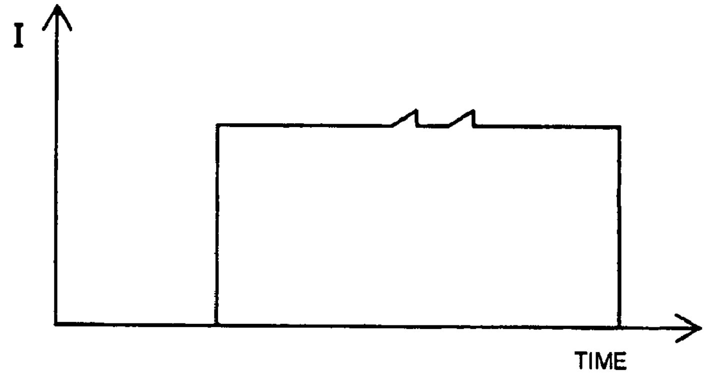
FIG. 5D is a graph of current versus time for the drive current in response to the square wave as shown in FIG. 5C being output from the amplifier of the current driver in FIG. 3.

FIG. 5D shows the waveform of the drive current when these comb-tooth pattern square waves are output by the amplifier 22. As is shown, when the magnitude of the load on the stepping motor 5 increases, causing the drive current supplied from the power supply 13 to increase, the control part 21 immediately outputs the chopper signal, causing an immediate drop in the drive current. Because of this, the increase in the drive current due to the increase in the magnitude of the load is immediately compensated for, as shown in FIG. 5D, thereby causing the value of the drive current to remain essentially uniform.

When the value for the elevated drive current decreases, the voltage across the load resistor R2 also decreases. This drop in voltage causes the base voltage for the amplifier 41 in the waveform detector 40 to drop to generate a collector current in the amplifier 41. This collector current assumes a comb-tooth pattern chopper waveform, shown in FIG. 4A, synchronized with the chopper signal.

Here the leftmost graphs under (1) in FIGS. 4A–4C show the state wherein the magnitude of the load on the stepping motor 5 is essentially at the rated value, in which case the quantity of the chopper signals output from the current driver 20 is small. As the magnitude of the load increases, as illustrated from right to left in the graphs in FIG. 4A, the number of chopper signals increases, and the waveform in the rightmost graphs under (4) in FIGS. 4A–4C illustrate the state immediately prior to the stepping motor 5 stalling. Additionally, as the number of the chopper signals increase, the widths of the pulses get larger, as shown in FIG. 4B, and, as shown in FIG. 4C, the voltage increases.

The memory 16 of the microcomputer 10 stores a specific pulse width (time) or a specific voltage as a threshold value, and if the signal input from the load magnitude detection circuit 30 indicates that the threshold value has been exceeded, the microcomputer stops the outputting of the command pulses, thereby stopping the rotation of the stepping motor 5, and stopping the movement of the shutter 3. At this time, the microcomputer 10 also illuminates the LED 11.

In addition, the microcomputer 10 clears the contents of the memory 16 and, at the same time, clears the number of command pulses stored in the register of the CPU 15. Consequently, when the shutter 3 arrives at the lower limit position and the magnitude of the load on the stepping motor 5 increases, the lower limit position of the shutter 3 is stored in the memory 16 because the contents of the register in the CPU 15 and of the memory 16 are cleared.

Next, the UP switch 14*a* is automatically actuated to wind up the shutter 3. When this is the case, the value in the register of the CPU 16 is incremented each time the microcomputer 10 outputs a command pulse. When the bottom edge of the shutter 3 arrives in, for example, the vicinity of the opening 1*a* of the housing 1, a guard part 3*b* equipped at the bottom edge of the shutter 3 fits into the opening 1*a* of the housing 1, and the load on the stepping motor 5 increases. The microcomputer 10 stops outputting the command pulses in this case as well, in the same way as described above, thereby stopping the winding of the shutter 3. Furthermore, the microcomputer 10 stores into the memory 16 the number of command pulses stored in the register of the CPU 15. Consequently, when the shutter 3 arrives at the upper limit position and the magnitude of the load on the stepping motor 5 increases, the number of command pulses output in order to move the shutter 3 from the lower limit position to the upper limit position is stored in the memory 16 to thereby effectively store the upper limit position of the stutter 3.

It should be noted that the switches 14*a*–14*e* on the switchboard 14 can be implemented to enable, for example, manual setup, automatic setup, automatic operation, manual operation, or the like of the shutter mechanism.

After the upper limit position and lower limit position for the shutter 3 have been set, either manually or automatically, as shown above, operations to open and close the shutter are performed automatically. In other words, when the DOWN switch 14*b* is operated when the shutter 3 is at the upper limit position, the value in the register of the CPU 15 is decremented. The CPU 15 of the microcomputer 10 constantly references the value of the register, and stops outputting command pulses when the value reaches 0. This stops the shutter 3 at the lower limit position. When the UP switch 14*a* is actuated, the value in the register of the CPU 15 is incremented, and the CPU 15 compares the value of the register to the value stored in the memory 16. The microcomputer 15 stops outputting the command pulses when the value in the register becomes equal to the value in the memory 16, thereby stopping the shutter 3 at the upper limit position. Note that even if the shutter 3 is raised while it is in the process of being lowered, or if the converse occurs, the register switches from decrementing to incrementing (or the converse). Therefore, the shutter 3 will always stop at the upper limit position or the lower limit position.

Next, operation of the above described shutter mechanism in the presence of an obstruction, such as freight, in the path of the shutter 3 will be explained. In such a situation, the memory 16 in the microcomputer 10 has a specific pulse width (time) or a specific voltage stored as a threshold value so that if the signal input from the load magnitude detection circuit 30 indicates that the threshold value has been exceeded, the outputting of the command pulses is stopped to stop the movement of the shutter 3. This makes it possible to prevent in advance damage to the shutter 3 and the obstruction, as well as other components in the shutter mechanism.

Here the threshold value stored in the memory 16 may be different for the automatic setup from what it is for obstruction detection. For example, the threshold value may correspond to a relatively small increase in the magnitude of the load, as indicated by the exemplary pulses shown in FIG. 4A(2), for the automatic setup, while the threshold value can correspond to a relatively large increase in the magnitude of the load, as indicated by the exemplary pulses shown in FIG. 4A(3), during operation. In such a configuration, the load applied on the components of the shutter mechanism when the shutter 3 arrives at the upper limit position or the lower limit position during operation will be minimal. Also, this makes it possible to avoid problems such as the shutter 3 stopping unintentionally during operation due to increased resistance caused by, for example, rust or dirt adhering to guides that support the shutter 3.

Note that it is possible to reduce the load that is applied when the shutter 3 reaches the upper limit position or the lower limit position by stopping the output of the command pulses prior to reaching zero or the set value when the value of the register of the CPU 15 increments from zero to reach the set value, or when the value of the register decrements from the set value to reach zero.

Because the shutter mechanism of the present invention includes a stepping motor 5 the motive source for the drum 2, it is possible to control and stop the rotor of the stepping motor 5 at the same time that the output of command pulses from the microcomputer 5 is stopped. Consequently, it is possible to increase the precision with which the shutter 3 is stopped without the need for extra parts, such as sensors. Furthermore, because a load magnitude detection circuit 30 is provided to detect the magnitude of the load on the stepping motor 5, it is possible to use the detection results thereof to set the upper limit position and lower limit position for the shutter 3, and to use the detection results thereof in, for example, emergency stops.

In other words, because the number of command pulses stored in the memory 16 is reset when the load magnitude detection circuit 30 detects an increase in the magnitude of the load generated by the stepping motor 5, and the number of command pulses output to that point is stored in the memory 16 when the load magnitude detection circuit 12 detects an increase in the magnitude of the load generated by the stepping motor 5 after the outputting of the command pulses is restarted, the lower limit position and upper limit position of the shutter 3 can be set automatically.

The shutter mechanism of the present invention as described above also enables detection results of the load magnitude detection circuit 30 to set the upper limit position and the lower limit position automatically for the object to be selectively wound and unwound, and to use the results of the detection in, for example, emergency stops.

The shutter mechanism and stepping motor control apparatus of the present invention are useful in a wide variety of applications, such as in structures wherein the torque of a stepping motor acts on an object when unwinding the object, such as is the case with shutters. However, the shutter mechanism and stepping motor control apparatus of the present invention may also be applicable when the torque from the stepping motor does not act on objects, such as, for example, drapes, curtains, blinds, or the like. In addition, the shutter mechanism and stepping motor control apparatus of the present invention may also be applicable to structures that are essentially rigid, such as wire, in which case the torque acts on the object. The shutter mechanism and stepping motor control apparatus of the present invention may also be applicable to, for example, sign boards, lighting equipment, partitioning curtains, gondolas ridden by workers, and other winding devices wherein there is hoisting using wires, chains, and the like.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A shutter mechanism, comprising:

a drum including an object wound thereon;

a stepping motor electrically connected to the drum for rotating the drum to selectively wind and unwind the object;

a chopper-type current source driver electrically connected to the stepping motor for supplying a drive current to the stepping motor and for generating chopper signals to chop out square waves output by the driver;

a controller for controlling the driver to enable the driver to supply the drive current to the stepping motor, the controller including a memory for storing motor control data for use by the controller; and a load magnitude detection circuit in electrical communication with the stepping motor for detecting a magnitude of a load at the stepping motor, and for outputting a load signal indicative of the magnitude of the load at the stepping motor to the controller, wherein the controller is for starting and stopping an output of command pulses to the driver based on the load signal and on the motor control data stored in the memory.

2. The shutter mechanism of claim 1, wherein the load magnitude detection circuit is for detecting an increase in the magnitude of the load at the stepping motor when the object reaches an upper limit position or a lower limit position.

3. The shutter mechanism of claim 1, wherein the motor control data stored in the memory comprises a number of command pulses to be output by the controller to move the object between the upper limit position and the lower limit position.

4. The shutter mechanism of claim 3, wherein the controller is for resetting the number of command pulses stored in the memory at the same time as stopping the output of the command pulses when the load magnitude detection circuit detects the increase in the magnitude of the load at the stepping motor.

5. The shutter mechanism of claim 4, wherein the controller is further for resuming outputting of the command pulses and for stopping the outputting of the command pulses when the load magnitude detection circuit next detects an increase in the magnitude of the load at the stepping motor; and the memory is further for simultaneously storing a number of command pulses output until the load magnitude detection circuit next detects an increase in the magnitude of the load at the stepping motor.

6. The shutter mechanism of claim 5, wherein the memory comprises a non-volatile memory for storing the number of command pulses.

7. The shutter mechanism of claim 6, wherein the controller is for comparing a number of command pulses output to the driver to the number of command pulses stored in and read out from the non-volatile memory to thereby stop the object at the upper limit position or at the lower limit position.

8. The shutter mechanism of claim 7, wherein the load magnitude detection circuit is further for detecting the increase in the magnitude of the load generated at the stepping motor when the object is moved between the upper limit position and the lower limit position when the object is stopped, or a direction of movement thereof is reversed.

9. The shutter mechanism of claim 8, wherein the increase in the magnitude of the load when either the object is stopped or when the direction of movement thereof is reversed is greater than the increase in the magnitude of the load when the number of command pulses stored in the memory is reset or when the number of command pulses is stored in the memory.

10. The shutter mechanism of claim 1, wherein the load magnitude detection circuit includes a waveform detector that detects the chopper signals, and wherein the load magnitude detection circuit is for detecting the magnitude of the load at the stepping motor based on a waveform output from the waveform detector.

11. The shutter mechanism of claim 10, wherein the load magnitude detection circuit includes a filter for converting the waveform output from the waveform detector into a series of pulses, and wherein the load magnitude detection circuit is for detecting the magnitude of the load at the stepping motor based on widths of the pulses output by the filter.

12. The shutter mechanism of claim 10, wherein the load magnitude detection circuit includes a filter that converts the waveform output from the waveform detector into voltage signals, and wherein the load magnitude detection circuit detects the magnitude of the load at the stepping motor based on the voltage signals output by the filter.

13. A stepping motor control apparatus for controlling upper and lower limit stopping positions of a stepping motor, comprising:

a microcomputer including a memory for storing upper and lower limit motor stopping position data;

a load magnitude detector circuit for detecting an increase in a load at the stepping motor and for inputting a signal indicative thereof to the microcomputer; and a chopper-type current driver for causing a drive current to be supplied to the stepping motor and for generating chopper signals to chop out square waves output by the current driver, wherein the microcomputer is further for controlling the current driver to enable the current driver to selectively start and stop supplying of the drive current to the stepping motor based on the stored upper and lower limit motor stopping position data in response to receiving the signal indicative of the increase in the load at the stepping motor from the load magnitude detector circuit.

14. The stepping motor control apparatus of claim 13, wherein the upper and lower limit motor stopping position data stored in the memory comprises a number of command pulses to be output by the microcomputer to the current driver.

15. The stepping motor control apparatus of claim 14, wherein the microcomputer is for comparing a number of command pulses output thereby to the current driver to the number of command pulses stored in and read out from the memory for purposes of determining whether the upper or lower limit motor stopping position has been reached.

16. The stepping motor control apparatus of claim 13, wherein the load magnitude detection circuit is further for detecting the increase in the load at the stepping motor when an object being moved by the stepping motor is stopped, or a direction of movement thereof is reversed.

17. The stepping motor control apparatus of claim 13, wherein the load magnitude detection circuit includes a waveform detector that detects the chopper signals, and wherein the load magnitude detection circuit is for detecting a magnitude of the load at the stepping motor based on a waveform output from the waveform detector.

18. A stepping motor control apparatus for controlling bi-directional first and second stopping positions of an object moved by a stepping motor, comprising:

a microcomputer including a memory for storing first and second stopping position data;

a load magnitude detector circuit for detecting an increase in a load at the stepping motor and for inputting a signal indicative thereof to the microcomputer;

a chopper-type current driver for causing a drive current to be supplied to the stepping motor and for generating chopper signals to chop out square waves output by the current driver, wherein the microcomputer is further for controlling the current driver to selectively start and stop supplying of the drive current to the stepping motor based on the stored first and second stopping position data and on the signal indicative of the increase in the load at the stepping motor from the load magnitude detector circuit.

19. The stepping motor control apparatus of claim 18, wherein the load magnitude detection circuit includes a waveform detector that detects the chopper signals, and wherein the load magnitude detection circuit is for detecting a magnitude of the load at the stepping motor based on a waveform output from the waveform detector.

20. The stepping motor control apparatus of claim 19, wherein the load magnitude detection circuit includes a filter for converting the waveform output from the waveform detector into a series of pulses, and wherein the load magnitude detection circuit is for detecting the magnitude of the load at the stepping motor based on widths of the pulses output by the filter.

21. The stepping motor control apparatus of claim 19, wherein the load magnitude detection circuit includes a filter that converts the waveform output from the waveform detector into voltage signals, and wherein the load magnitude detection circuit detects the magnitude of the load at the stepping motor based on the voltage signals output by the filter.

* * * * *